United States Patent Office 2,932,351
Patented Apr. 12, 1960

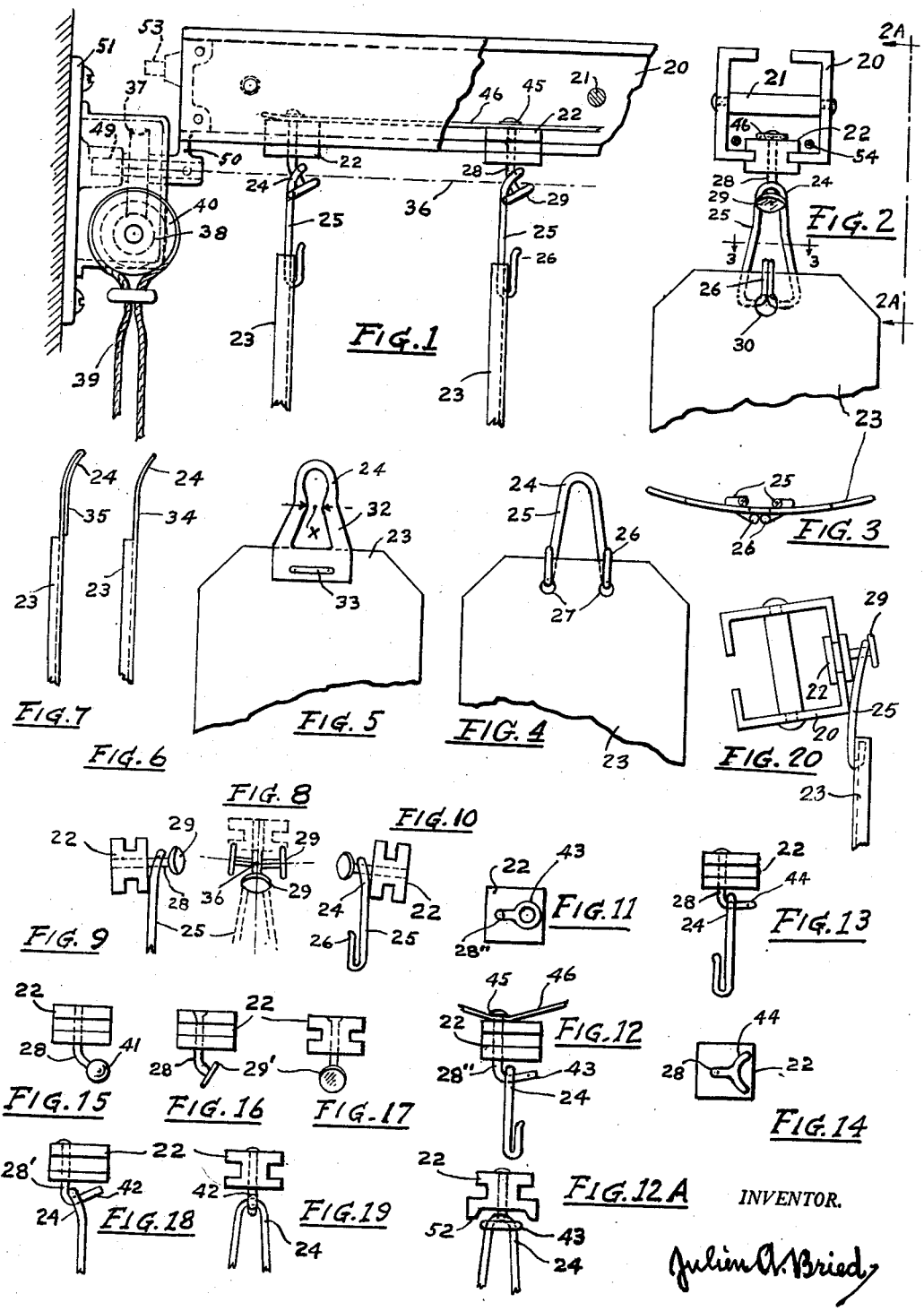
April 12, 1960     J. A. BRIED     2,932,351
VERTICAL SLAT BLIND SUSPENSION
Filed June 2, 1958
INVENTOR.
Julian A. Bried

2,932,351

VERTICAL SLAT BLIND SUSPENSION

Julien A. Bried, Berkeley, Calif.

Application June 2, 1958, Serial No. 739,221

24 Claims. (Cl. 160—176)

This invention relates to vertical slat Venetian blinds, and has for its object improvements in the suspension of the slats from their upper ends whereby a better turning action is obtained and which has less swinging and flutter to the slats in the variously open position in this type of slat blind operated by an overhead rock bar from which the slats are suspended from carriers or sliders carried by the bar.

The particular features of novelty will be seen in the accompanying drawings and as described in the following description.

In the drawings,

Fig. 1 is a side elevation of a portion of the overhead rock bar showing a couple of the slats hanging from the bar, in open position and showing one form of the suspension.

Fig. 2 is an end view of Fig. 1.

Fig. 3 is a plan view of the slat of Fig. 2 showing its wire suspension loop attached.

Fig. 4 is an elevation of the upper portion of a slat as of Fig. 2, but showing a modified form of the suspension wire loop.

Fig. 5 is a view like that of Fig. 4 but showing a sheet metal or stiff plastic loop attached to the slat.

Fig. 6 is a vertical edge view of the upper portion of a slat showing the loop formed integrally of the slat material.

Fig. 7 is a view like that of Fig. 6 but showing the loop extension of the slat material doubled over to strengthen it.

Fig. 8 is a diagrammatic end view of a slat suspending carrier or slider with its pin in central, and in right and left positions as when the rocker bar is rocked either way on a horizontal axis passing substantially through the slat suspension point of the nail-like suspension pin just above its nail head or stop.

Figs. 9 and 10 respectively show the suspension loop with respect to the slider when rocked to extreme opposite positions, and with the wire suspension loop aligned against the bottom of the slider.

Figs. 11 and 12 show respectively the side and bottom of a slider with a modified form of suspension pin showing a small eyelet at the end of the pin for a stop.

Fig. 12A is an end view of Fig. 12 with a modified form of slider block.

Figs. 13 and 14 are similar views to those of 11 and 12 but showing the stop formed of a portion only of the eyelet.

Fig. 15 shows the use of a ball as the stop on the slat suspension pin.

Figs. 16 and 17 show respectively the side and end view of a slider with a nail as the suspension pin, but formed with a head slanted with respect to the shank of the nail as the stop.

Figs. 18 and 19 show respectively the side and end view of a slider with a plain hooked pin for suspending the slats, and which will operate but not so stably as the others.

Fig. 20 is a side elevation as of Fig. 2 but with the bar 20 tilted and in contact with the legs of the suspension loop and locking the slat in closed position.

Before describing the drawings in detail it will make the invention more understandable to point out that it particularly concerns the discovery by me that a vertically suspended Venetian blind slat may be turned gradually from open position at right angles either way when suspended by a rigid loop from a slider with a projecting common nail head or its equivalent, as the slider is rocked transversely to various angles, and will have a stability and more freedom from flutter and swinging than ever before attained by a simple cheap construction and also will lock the slats in final closed position, all without the use of gears or complicated devices. Also, that while a simple nail may be used as the suspension pin, and with its head as a guide and stop, to keep the slat from falling off, there may be several modifications of the shape and disposition of the head or stop, some of which operate more effectively than a plain nail head, though they are not quite as cheap, while others though shown in the drawings permit more flutter and swinging of the slats.

Again in the drawings: the horizontally disposed overhead rock bar is shown as a pair of confronting channels, 20, spacedly secured together as by stay rods or shouldered rivets, 21, to form a track for common grooved slider blocks 22, from each of which a slat 23 is suspended from its upper end as by a wire loop 24 engaging around a pin 28 projecting from the slider. The loop preferably is provided with two legs 25 hooked as at 26 through two holes 27 in the slat preferably so as to form a stiff unit with the slat so the slat is not free to substantially flutter or shake independently of the loop, and thereby provide a slat suspension with but one point of relative movement of suspension parts, i.e. the movable contact of the loop 24 with the pin or nail 28 which has a stop of some kind or head 29 to keep the loop from falling off, as well as to guide the slat in turning when the slider is tilted or the bar is rocked.

However, even if the connection of the loop to the slats were somewhat loose, the slat would turn properly in rocking the bar, but would not be so free from flutter.

Instead of providing two holes in the slat for the loop as shown in Fig. 4 at 27 a stable connection may be effected through one hole 30 as shown in Fig. 2 and wherein the two legs 25 of the loop are spread apart to engage the far side of the slat, then return to the hole to form two hook ends 26 tightly embracing the forward side of the slat (in this view).

Various other arrangements of the suspension loop may be provided, such as in Fig. 5 where a loop of stiff sheet material 32 is simply stapled as at 33 to the slat, or an extension 34 of the slat material itself is used to form the loop as in Fig. 6, or the slat material may be doubled on itself as in Fig. 7 at 35 to make a stronger loop 24, as the Venetian blind slat material is very thin. However, for best results the operating edges of the loop should be well rounded and therefore a thick wire or its equivalent works best.

The coaction between the nail or pin 28 and the loop 24 in turning the slat upon sidewise tilting of the slider from which the nail projects is hard to describe, but it will be noted from Fig. 1 that the shank 28 of the nail extends at an angle in the vertical plane of the rock bar (when the slats are in open position), and when the bar is tilted to about 90 degrees the nail and its head are both at right angles to the open position of the slats and therefore turn the slats at right angles to closed position.

It will be noticed that in Fig. 1 the upper end of the loop 24 is bent over to the right to slant in the same direction as the nail head, and while it will operate nicely if the loop is slanted the same as the nail head so as to contact it all over, yet it hangs steadier if the angle of the loop is a trifle less than the angle of the nail head so that the loop acquires a three point contact with the nail, one point where the loop engages the pin or shank of the nail at a point spaced above the head as shown in Fig. 1, and two points below where each of the spaced legs 25 of the loop contact the circular head of the nail. While the loop should be a loose fit around the nail it may have a restricted portion as at X in Fig. 5 to prevent its accidental removal.

In Fig. 8 the three main positions of the nail are indicated, as they would be when the rock bar is rocked preferably about a horizontal center line 36 which passes substantially through the point of suspension of the slat loops and thus results in the minimum bodily displacement of the slat blind as a whole when the bar is rocked, a principle first shown in Toti Patent No. 2,785,745. But it will operate properly whether or not the bar is rocked about such a center as the axis.

It should be noted from the extreme right and left rocked position of the slider 22, that the upper portions of the two legs of the loop are urged into contact with underside of the slider which in turn forces the slats to closed marginal overlapping position (see Figs. 9 and 10), and locks them closed by reason of the rocker control mechanism including a worm gear 37 secured to the rocker turned by a worm 38 in turn operated by a pull cord 39 or chain about a wheel 40 on the worm shaft, as well known in the art.

While a simple common round wire nail with a round flat head projecting angularly from the slider as shown in Figs. 1, 2, 8, 9, and 10 will operate nicely, supporting pins of other forms will also operate in the same manner—thus as shown in Fig. 15 the nail head may be a ball 41 on the lower end of the pin 28, or the pin need not project at an angle from the slider, but may extend straight down as shown in Figs. 16 and 17 and the flat head of the nail be bent at an angle close to the pin as at 29' and the suspension loop 24 may or may not be offset to the same angle as the head, or as in Figs. 18 and 19, even a plain round pin 28' may extend straight downward and then upward at an angle as at 42 to form a stop and guide the suspension loop to turn, but this form permits of too much freedom of the slat to swing and flutter in all directions and is not positive in its action.

The most stable of the various suspension pins tried out is shown in Figs. 11 and 12 wherein a common threaded wire eyelet 43 has its shank 28" bent at about right angles and is screwed tightly through the slider block 22 with the eyelet portion extending substantially horizontally or preferably somewhat upwardly and spaced sufficiently below the slider for free action of the loop 24. This one appears to provide a better stability at various positions of the slat, and while such eyelets are cheap and obtainable in all sizes, since it is only the two portions of the ring close to the shank which force the loop 24 to turn as the slider is tilted, it follows that the outer end of the eyelet ring could be flattened or entirely omitted as indicated in Figs. 13 and 14 where the curved wire cross bar 44 may be considered as a portion of a complete ring or eyelet. Such a pin is more expensive to make than a complete wire eyelet, though it could be filled in solid between the "horns" of the curved wire to form a solid block if easier to make, as obviously it is the convexly curved portion adjacent the loop 24 which guides the loop of the wire slat hanger to turn.

The latter two forms of the suspension pin head or stop require less tilting of the slider to effect a right angle turning of the slats, and therefore the body of the slider may be thicker at the edges or channel shaped as in Fig. 12ᴬ at 52 so as to contact the two legs of the loop at the point where the slats have turned near to the closed position to force and lock the slats closed or the rock-bar itself may be tilted far enough to contact the legs of the suspension loop to lock the slats in closed position as shown clearly in Fig. 20.

It should be noted that with the form of pin shown in Figs. 11, 12, 13 and 14, the suspension loop 24 does not require to be offset from the legs 25 as shown for the slanted shanks or heads of the forms shown in Figs. 1, 15 and 16, if formed as shown in the drawings to permit the slat to hang vertical in its open position yet without freedom to materially wobble.

The upper end of the pin may project through the slider block as indicated in Fig. 12 and there used to secure as as 45, a slat maximum spacing tape or cord 46 as common in the art, or the pin of Fig. 12 may be a cotter or split pin made with a proper size ring instead of a wire eyelet, and one of its free ends bent over or forced into the slider block and its other free end used to secure the spacing tape or cord, a simple variation readily understood and not requiring an additional drawing.

It should be noted that while I show the "sliders" or traversing carriers of the slats as solid blocks, this is only illustrative, as such "sliders" are variously made in the art as of sheet metal, plastic, wire, and also with rollers, and my use of the word "sliders" where not specific is intended to include all variations which will operate as described.

The pivotal mounting of the rock bar may be as shown in the Toti patent above mentioned, or any suitable way, but here shown as by a bearing pin 49 (at both ends of the rocker) carried by a suitable bracket 50 secured to the rock bar, and with the pins or axles supported in bearing plates or brackets 51 of any desired form for in turn securing to the window casing or to a suitable cornice box, not shown, as well understood in the art.

Also, preferably a stop pin or lug is provided on the rock bar and one of the fixed bearing brackets 51 to limit the degree of tilting or rocking of the bar to the point where the slats are all properly closed at both extremes of turning. Such a stop device may take various forms but is indicated in Fig. 1 as a projecting pin or lug as dotted at 53 to strike a cooperating stop pin or lug on the fixed bearing bracket (both preferably at opposite end of rock-bar).

It should also be noted that while I show the improved suspension as applied to the common Venetian blind slats which are arched in cross section, it may be applied equally well to either side of the slat, or to flat slats or any other cross sectional form of slat. Also the sliders and their slats are drawn along the rock-bar to any desired position by suitable chains or traverse pull cords 54 carried by the bar as well known in the art and not involved in the present invention.

Having thus described my improved vertical slat blind suspension and the manner of its operation, what I claim is:

1. In a vertical slat blind suspension wherein the slats are turned by transversely tilting a horizontally disposed rock-bar from which the slats are suspended, the improvement comprising carriers on the rock-bar, one for each slat, a pin projecting downwardly from each carrier, a suspension loop at the upper end of each slat freely engaged about the projecting part of said pin, the pin provided with stop means below the engaged portion of the pin and offset from one side of the loop lengthwise of the bar to prevent the loop from falling off when the slat is hanging in open position and formed to cooperate with said pin and loop to gradually turn the loop with its slat to closed position when the carrier is tilted transversely with the bar as the bar is rocked.

2. In a vertical slat blind suspension wherein the slats are turned by transversely tilting a horizontally disposed rock-bar from which the slats are suspended, the improvement comprising carriers on the rock-bar, one for each slat, a pin projecting downwardly from each carrier, a rigid suspension loop at the upper end of each slot freely engaged about the projecting part of said pin, the pin provided with stop means below the engaged portion of the pin and offset from one side of the loop lengthwise of the bar to prevent the loop from falling off when the slat is hanging in open position and formed to cooperate with said pin loop to gradually turn the loop with its slat to closed position when the carrier is tilted transversely with the bar as the bar is rocked in either direction.

3. In the structure set out in claim 1 said carrier formed to contact the sides of the loop and lock the slat in the closed position when the bar is rocked to final position.

4. In the structure set out in claim 1 said pin being in form substantially that of a round wire nail with its head attached and with the head extending at a slant with respect to the vertical.

5. In the structure set out in claim 1 said pin being in form substantially that of a round wire nail with its head attached and with the head extending at an angle to the vertical, and the engaging portion of the loop extending at an angle to the vertical to contact the head while engaged about the projecting part of the pin.

6. In the structure set out in claim 1 said pin being in form substantially that of a round wire nail with its head attached and with the head extending at an angle to the vertical, and the engaging portion of the loop extending at a lesser angle to contact the head at two points and the pin at one point above it.

7. In the construction set out in claim 1 said carriers being traversable along the bar, and said pin projecting also through the top of the carrier and there secured to a flexible carrier maximum spacing element.

8. In the construction set out in claim 1 said carriers being in traversable engagement with the bar and said loop provided with two spaced legs connecting the slat, and the proportions and arrangement being such as to bring both legs in contact with the carrier when tilted to turn the slat to closed position.

9. In the construction set out in claim 1 said carriers being in traversable engagement with the bar and said loop provided with two spaced legs connecting the slat, and the proportions and arrangement being such as to bring both legs in contact with the carrier when tilted to turn the slat to closed position and the normally underside of the carrier being of inverted channel form to provide two closing ridges to contact the legs of the loop adjacent the point of suspension.

10. In the construction set out in claim 1 means mounting the rock-bar for rocking about a horizontal axis extending substantially through the point of the loop suspension point whereby the minimum bodily displacement of the blind is achieved.

11. In the construction set out in claim 1, means for mounting the rock-bar for rocking both right or left, and manually controlled means for so rocking the bar, together with its carriers, and stop means for limiting the extreme positions of rocking when the slats are closed to avoid lifting or swinging all of the slats bodily.

12. In the construction set out in claim 1 said pin provided with an eyelet at its lower end as a stop extending laterally from the projecting pin in direction of the length of the rock-bar when the slat is in open position.

13. In the construction set out in claim 1 said pin provided with a round edged element at its lower end as a stop extending laterally from the projecting pin in direction of the length of the rock-bar when the slat is in open position.

14. In the construction set out in claim 1 said pin having a ball at the end to form the stop means.

15. In the construction set out in claim 1, said pin being bent upward at an angle at its lower end below the loop engagement, in a plane longitudinally of the rock-bar when the slat is in open position, to form the stop means.

16. In the construction set out in claim 1 said loop being made of round wire.

17. In the construction set out in claim 1 said loop being made of round wire and hooked to the upper end of the slat in a manner to turn as a unit therewith.

18. In the construction set out in claim 1 said loop being of stiff sheet material secured to the slat.

19. In the construction set out in claim 1 said loop formed of an integral extension of the slat material.

20. In the construction set out in claim 1, the loop connection to the pin being the only normally movable joint in the slat suspension to its carrier.

21. In the construction set out in claim 1, said rock-bar formed of two confronting channel bars spacedly secured together at spaced points to form confronting track edges engaged by said carriers for traverse movement therealong.

22. In a vertical slat Venetian type blind wherein the slats are suspended at their upper ends from a support, suspension means comprising a series of spaced pins, one for each slat projecting rigidly downwardly from the support, each pin having an exposed shank extending downwardly and laterally in direction of the series; when the slat is in open position; and each slat provided with a suspension loop extending above its upper end freely engaging about said shank, and a stop on the laterally extending portion of the pin formed to cooperate with said loop and pin to normally hold the slat in open position, and turn the slat gradually to closed position as the support is rocked transversely of said series.

23. In a vertical slat Venetian type blind wherein the slats are suspended at their upper ends from a support, suspension means comprising a series of spaced pins, one for each slat projecting rigidly downwardly from the support, each pin having an exposed shank extending downwardly and laterally in direction of the series; when the slat is in open position; and each slat provided with a suspension loop extending above its upper end freely engaging about said shank, and a stop on the laterally extending portion of the pin formed to cooperate with said loop and pin to normally hold the slat in open position, and turn the slat gradually to closed position as the support is rocked transversely of said series either way.

24. In a vertical slat Venetian type blind wherein the slats are suspended at their upper ends from a support, suspension means comprising a series of spaced pins, one for each slat projecting rigidly downwardly from the support, each pin having an exposed shank extending downwardly and laterally in direction of the series; when the slat is in open position; and each slat provided with a suspension loop extending above its upper end freely engaging about said shank, and a stop on the laterally extending portion of the pin formed to cooperate with said loop and pin to normally hold the slat in open position, and turn the slat gradually to closed position as the support is rocked transversely of said series, and lock the slat in closed position by the support contacting the extension of the loop to the slat.

References Cited in the file of this patent

UNITED STATES PATENTS

| | | |
|---|---|---|
| 2,173,275 | Houmere | Sept. 19, 1939 |
| 2,587,859 | King | Mar. 4, 1952 |
| 2,680,480 | Harju et al. | June 8, 1954 |
| 2,782,848 | Cereceda | Feb. 26, 1957 |
| 2,790,492 | Toti | Apr. 30, 1957 |
| 2,828,817 | Achler et al. | Apr. 1, 1958 |

FOREIGN PATENTS

| | | |
|---|---|---|
| 1,130,070 | France | Jan. 30, 1957 |